United States Patent
Li et al.

(10) Patent No.: US 12,172,272 B2
(45) Date of Patent: Dec. 24, 2024

(54) POWER TOOL CONTROL SYSTEM

(71) Applicant: TECHTRONIC CORDLESS GP, Anderson, SC (US)

(72) Inventors: Yong Min Li, Dongguan (CN); Li Hua Xie, Dongguan (CN); Zhong Kang Fang, Dongguan (CN); Ji Guang Sun, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 16 days.

(21) Appl. No.: 18/035,465

(22) PCT Filed: Nov. 5, 2020

(86) PCT No.: PCT/CN2020/126727
§ 371 (c)(1),
(2) Date: May 4, 2023

(87) PCT Pub. No.: WO2022/094851
PCT Pub. Date: May 12, 2022

(65) Prior Publication Data
US 2023/0415315 A1    Dec. 28, 2023

(51) Int. Cl.
*B25C 1/00* (2006.01)
*B25C 1/06* (2006.01)

(52) U.S. Cl.
CPC .............. *B25C 1/008* (2013.01); *B25C 1/06* (2013.01)

(58) Field of Classification Search
CPC ... B25C 1/008; B25C 1/00; B25F 5/00; B25F 5/001; B25F 5/02; B25F 5/006; B25F 5/008; B25F 3/00; B25F 5/021
(Continued)

(56) References Cited

U.S. PATENT DOCUMENTS

| 3,662,190 A | 5/1972 | Naber |
| 3,715,605 A | 2/1973 | Naber |
| (Continued) | | |

FOREIGN PATENT DOCUMENTS

| CN | 101786268 A | 7/2010 |
| CN | 104684693 A | 6/2015 |
| (Continued) | | |

OTHER PUBLICATIONS

International Search Report and Written Opinion for Application No. PCT/CN2020/126727 dated Jul. 29, 2021 (10 pages).
(Continued)

*Primary Examiner* — Jacob A Smith
(74) *Attorney, Agent, or Firm* — Michael Best & Friedrich LLP

(57) ABSTRACT

A control system for a power tool is disclosed. The control system comprises: a sensing unit configured to sense an operating characteristic of the power tool; a first control unit configured to determine whether the operating characteristic is within a safe operational range, and to output a first control signal at least partially based on the determination; a second control unit configured to determine whether the operating characteristic is within a safe operational range independently of the first control unit, and to output a second control signal at least partially based on the determination; and an output unit configured to receive the first and second control signals and to activate the power tool when the first and second control signals are received.

24 Claims, 4 Drawing Sheets

(58) Field of Classification Search
USPC .......................................................... 227/5
See application file for complete search history.

(56) References Cited

U.S. PATENT DOCUMENTS

| | | | |
|---|---|---|---|
| 5,553,478 | A | 9/1996 | Di Troia |
| 5,772,096 | A * | 6/1998 | Osuka .................... B25C 1/008 |
| | | | 227/8 |
| 7,551,411 | B2 | 6/2009 | Woods et al. |
| 7,592,773 | B2 | 9/2009 | Pellenc |
| 7,679,873 | B2 | 3/2010 | Ziegler |
| 7,854,360 | B2 | 12/2010 | Suda |
| 7,918,374 | B2 | 4/2011 | Gardner et al. |
| 8,089,247 | B2 | 1/2012 | Pellenc |
| 8,282,328 | B2 | 10/2012 | Gardner et al. |
| 8,413,867 | B2 | 4/2013 | Gardner et al. |
| 8,476,853 | B2 | 7/2013 | Vanko et al. |
| 8,841,871 | B2 | 9/2014 | Yang et al. |
| 8,939,340 | B2 | 1/2015 | Gardner et al. |
| 9,071,188 | B2 | 6/2015 | Vanko et al. |
| 9,240,747 | B2 | 1/2016 | Vanko |
| 9,420,747 | B2 | 8/2016 | Roberge |
| 9,722,525 | B2 | 8/2017 | Vanko et al. |
| 10,177,559 | B2 | 1/2019 | Uesugi et al. |
| 10,569,403 | B2 | 2/2020 | Namouz |
| 10,931,102 | B2 | 2/2021 | Mao |
| 2011/0307201 | A1 | 12/2011 | Yang et al. |
| 2013/0334277 | A1 | 12/2013 | Shima et al. |
| 2015/0273645 | A1 * | 10/2015 | Steurer ................ B21J 15/105 |
| | | | 173/1 |
| 2017/0373614 | A1 | 12/2017 | Lewis et al. |
| 2018/0272516 | A1 * | 9/2018 | Hecht .................... B25F 5/001 |
| 2018/0361553 | A1 * | 12/2018 | Brinkmann ............... B25F 5/00 |
| 2019/0052148 | A1 | 2/2019 | Rahnamaee et al. |
| 2019/0074683 | A1 | 3/2019 | Uesugi et al. |

FOREIGN PATENT DOCUMENTS

| | | | | |
|---|---|---|---|---|
| CN | 204893035 | U | | 12/2015 |
| CN | 204893888 | U | | 12/2015 |
| CN | 105291060 | A | | 2/2016 |
| CN | 105785799 | A * | 7/2016 | ............ G05B 19/04 |
| CN | 206807330 | U | | 12/2017 |
| CN | 207027419 | U | | 2/2018 |
| CN | 108544428 | A | | 9/2018 |
| CN | 109656156 | A | | 4/2019 |
| CN | 110855189 | A | | 2/2020 |
| EP | 2511053 | A2 | | 10/2012 |
| EP | 2786844 | A1 | | 10/2014 |
| EP | 3150339 | A1 | | 4/2017 |
| WO | 2008029513 | A1 | | 3/2008 |
| WO | 2017022361 | A1 | | 2/2017 |
| WO | 2020094548 | A1 | | 5/2020 |

OTHER PUBLICATIONS

Extended European Search Report for Application No. 20960312.5 dated Aug. 27, 2024 (8 pages).

* cited by examiner

POWER TOOL CONTROL SYSTEM

TECHNICAL FIELD

The invention relates to a control system for a power tool, and in particular to a control system having multiple control units for controlling activation of the power tool. The invention also relates to a power tool including the control system.

BACKGROUND

Power tools typically comprise one or more moving components configured to produce useful work for carrying out a specific task. At least one moving components is typically exposed so as to enable interaction with a workpiece. The exposed component may be translating, oscillating, rotating, or otherwise moving at a high velocity and could therefore cause significant injury to the user upon accidental contact. To reduce the risk of injury to the user, some power tools comprise control systems which monitor one or more safety-critical characteristics of the tool to prevent operation in the event that one or more of the safety-critical characteristics are outside the range of safe operation. The efficacy of such safety control systems may depend upon the robustness of the power tool, the accuracy of the sensors, and the control logic employed by the control system. Over time sensor accuracy may decrease due to wear and tear, which may allow the power tool to be operated under unsafe conditions. Furthermore, the control logic may not account for all possible circumstances under which the power tool can be used, and therefore there may be outlying circumstances in which the control logic will permit operation of the power tool even though it is potentially unsafe to do so.

SUMMARY

An object in some embodiments of the invention is to provide a power tool, control system and/or method with improved safety. Another object in some embodiments of the invention is to provide a power tool, control system and/or method which obviates or mitigates one or more disadvantages in the prior art, whether identified herein or elsewhere, or provides a useful alternative. Other object(s) of various embodiments of the invention will become apparent by referring to the description and drawings.

According to a first aspect of the invention, there is provided a control system for a power tool, comprising: a sensing unit configured to sense an operating characteristic of the power tool; a first control unit configured to determine whether the operating characteristic is within a safe operational range, and to output a first control signal at least partially based on the determination; a second control unit configured to determine whether the operating characteristic is within a safe operational range independently of the first control unit, and to output a second control signal at least partially based on the determination; and an output unit configured to receive the first and second control signals and to activate the power tool when the first and second control signals are received.

That is to say, the first control unit outputs the first control signal at least partially based on the determination made by the first control unit and the second control unit outputs the second control signal at least partially based upon the determination made by the second control unit. It will be understood that the first and second control units may be configured to take additional factors into account before outputting their associated control signals, such as for example the status of a trigger or the status of other operating characteristics of the power tool (e.g. temperature etc.).

When the control unit receives both the first and the second control signals the control unit will activate the power tool. However, if one of the first or second control signals is not received by the control unit, the power tool will not be activated. Because the first and second control units make their respective determinations separately (i.e. in isolation from one another) the determination of one control unit can be used to verify the determination of the other, and vice versa. As such, the control system is able to prevent activation of the power tool in the event that the determination by one of the control units that the power tool is safe to activate cannot be corroborated by the second control unit. This "double check" ensures that physical malfunctions, for example in the sensing unit, or logical malfunctions, for example in the first and second controllers themselves, are more likely to be identified and any associated unsafe activation of the power tool prevented.

Activation of the power tool will be understood to encompass operating the power tool to produce useful work. This may include, for example, the activation of a prime mover (e.g., motor), actuation of a solenoid, the creation of an electrical arc at a spark plug to ignite a fuel-air mixture, or the like.

The operating characteristic of the power tool may be any suitable operating characteristic, and in particular a safety-critical operating characteristic for which it is necessary to prevent activation of the power tool outside of a safe operating range. For example, the operating characteristic may be the distance of the power tool from a surface, an operating temperature of the power tool, an orientation of the power tool or any other suitable operating characteristic associated with the power tool.

The safe operational range may include any suitable range of operating conditions in which the power tool is safe to activate. For example, in the case of a nail gun this may be when a nose of the nail gun is in contact with a surface to be nailed. In other examples, the safe operating range may be a temperature range or the like.

The sensing unit may comprise: a first sensor configured to sense the operating characteristic; and a second sensor configured to sense the operating characteristic independently of the first sensor; and wherein the first sensor is configured to output a first sensing signal to the first control unit and the second sensor is configured to output a second sensing signal to the second control unit. That is to say, the first control unit may be in communication with the first sensor and the second control unit may be in communication with the second sensor. In such embodiments, because the first sensor and the second sensor are configured to sense the operating characteristic separately from one another, the determinations of the first and second control units are based on different inputs. As such, the determination of one control unit can be used to verify the determination of the other and vice versa.

The first control unit may be configured to determine whether the operating characteristic is within a safe operational range at least partially based upon the first sensing signal. The second control unit may be configured to determine whether the operating characteristic is within a safe operational range at least partially based upon the second sensing signal.

The output unit may comprise: a first switching unit configured to activate in response to the first control signal; and a second switching unit configured to activate in response to the second control signal. Activation of the first switching unit and second switching unit may cause activation of the power tool. Put another way, the first switching unit may be in communication with the first control unit and the second switching unit may be in communication with the second control unit. Activation of the switching units may comprise electrically closing the switching units to provide an electrical pathway across the switching units.

The first switching unit and the second switching unit may be connected in series. Because the switching units are arranged in series, both of the switches must be activated to activate the power tool. The switching units may comprise one or more semiconductor switches, e.g., transistor, FET, or MOSFET.

The power tool may comprise a trigger configured to output a trigger signal to the first control unit and the second control unit simultaneously. The first control unit may be configured to output the first control signal at least partially based on the trigger signal, and the second control unit may be configured to output the second control signal at least partially based upon the trigger signal. That is to say, the first and second control units may receive a common trigger signal, and the first and second control units may output the first and second control signals at least partially in response to the trigger signal. As such, the control units will only output their associated control signals when the characteristic is such that it is safe to operate the power tool and when the trigger has been depressed by the user. This prevents accidental and unsafe usage of the power tool. In alternative embodiments, the trigger may be replaced by any suitable user input, for example a button, or a switch or like.

The first control unit may be configured to output the first control signal based on a first control logic and the second control unit may be configured to output the second control signal based on a second control logic different to the first control logic. That is to say, the first control unit may be configured to output the control signal based on a different decision making process than the second control unit. Because the logic employed by each control unit is different, this helps to ensure that erroneous decisions based on systemic logic errors are identified, and the power tool is not activated based on such erroneous decision making.

The first control unit may comprise a first microcontroller having a first firmware, and the second control unit may comprise a second microcontroller having a second firmware different to the first firmware.

The operating characteristic may be contact between a nose of the power tool and a workpiece. The safe operational range of the operating characteristic may be when the nose is in contact with the workpiece. An associated unsafe operational range may be when the nose is not in contact with the workpiece.

The sensing unit may comprise one or more contact sensors. The first sensor may be a contact sensor, and optionally, the second sensor may be a contact sensor.

The operating characteristic may be a first characteristic and the sensing unit may be a first sensing unit. The control system may further comprise a second sensing unit configured to sense a second operating characteristic of the power tool. The first control unit may be configured to determine whether the second operating characteristic is within a safe operational range and to output the first control signal at least partially based on the determination. The second control unit may be configured to determine whether the second operating characteristic is within a safe operational range and to output the second control signal at least partially based on the determination.

The first control unit may be configured to output the first control signal at least partially based upon the determination of whether the first operating characteristic is within a safe operational range and at least partially based upon whether the second operating characteristic is within a safe operational range. The second control unit may be configured to output the second control signal at least partially based upon the determination of whether the first operating characteristic is within a safe operational range and at least partially based upon whether the second operating characteristic is within a safe operational range. In further embodiments, the control units may output their associated control signals in dependence upon substantially any number of operating characteristics of the power tool.

The second sensing unit may comprise: a third sensor configured to sense the second operating characteristic; and a fourth sensor configured to sense the second operating characteristic independently of the third sensor. The third sensor may be configured to output a third sensing signal to the first control unit and the fourth sensor may be configured to output a fourth sensing signal to the second control unit.

The second operating characteristic may be a temperature of a prime mover (e.g., motor) of the power tool. The safe operational range of the second characteristic may be one or more of: a temperature range corresponding to a range of temperatures at which the prime mover (e.g., motor) is configured to operate as recommended by the manufacturer; and a temperature range corresponding to a range of temperatures at which the PCB is configured to operate as recommended by the manufacturer.

The second sensing unit may comprise one or more temperature sensors. In particular, the third sensor may be a temperature sensor, and optionally, the fourth sensor may be a temperature sensor. The temperature sensor may include one or more of: thermistor (such as NTC thermistor), resistance thermometer (resistance temperature detector), thermocouple, semiconductor-based sensor (e.g., on integrated circuits), etc.

According to a second aspect of the invention, there is provided a nail gun comprising a control system according to the first aspect of the invention. Optionally, the nail gun may comprise a nose. The sensing unit may be positioned at a terminal end of the nose and may be configured to detect contact between the nose and a workpiece.

According to a third aspect of the invention, there is provided a power tool comprising a control system according to the first aspect of the invention. The power tool may be a fastener driver arranged to drive fasteners (e.g., nails, tacks, staples, etc.) into a workpiece utilizing various driving means (e.g., compressed air, electrical energy, flywheel mechanisms). In one example, the power tool is a gas spring fastener driver such as a nailer or nail gun. The power tool can be DC (e.g., battery) powered, or AC (e.g., mains) powered, or both DC and AC powered. Optionally, the power tool may comprise a nose for engaging a workpiece during operation. The sensing unit may be positioned at a terminal end of the nose and may be configured to detect contact between the nose and a workpiece.

According to a fourth aspect of the invention, there is provided a method of controlling a power tool, comprising: sensing an operating characteristic of a power tool using a sensing unit; determining whether the operating characteristic is within a safe operating range using a first control unit and outputting a first control signal at least partially based on the determination, determining, separately to the first control unit, whether the operating characteristic is within a safe operating range using a second control unit and outputting a second control signal at least partially based on the determination, receiving the first and second control signals using an output unit, and activating the power tool when the first and second control signals have been received by the output unit.

The method may further comprise: sensing the operating characteristic using a first sensor and outputting a first sensing signal to the first control unit using the first sensor; and sensing the operating characteristic, independently of the first sensor, using a second sensor, and outputting a second sensing signal to the second control unit using the second sensor. The operating characteristic may be contact between a nose of the power tool and a workpiece. The first and/or second sensors may be contact sensors.

The method may further comprise: determining whether the operating characteristic is within a safe operational range at least partially based upon the first sensing signal; and determining whether the operating characteristic is within a safe operational range at least partially based upon the second sensing signal.

The method may further comprise: outputting a trigger signal to the first control unit and the second control unit simultaneously in response to a user input; outputting the first control signal at least partially based upon the trigger signal; and outputting the second control signal at least partially based upon the trigger signal. The user input may be the user depressing the trigger.

The operating characteristic may be a first characteristic and the sensing unit may be a first sensing unit, and wherein the method may further comprise: sensing a second operating characteristic of the power tool using a second sensing unit; determining whether the second operating characteristic is within a safe operating range using the first control unit and outputting the first control signal at least partially based on the determination; and determining, separately to the first control unit, whether the operating characteristic is within a safe operating range using the second control unit and outputting the second control signal at least partially based on the determination.

The method may further comprise: sensing the second operating characteristic using a third sensor and outputting a third sensing signal to the first control unit using the third sensor; and sensing the operating characteristic, independently of the third sensor, using a fourth sensor and outputting a fourth sensing signal to the second control unit using the fourth sensor. The second operating characteristic may include the temperature of a prime mover (e.g., motor) of the power tool and/or the temperature of a PCB of the power tool. The third and/or fourth sensors may be temperature sensors.

The method of the fourth aspect of the invention may comprise any of the optional features of the control system of the first aspect of the invention, the nail gun of the second aspect of the invention, or the power tool of the third aspect of the invention.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and/or applicable.

BRIEF DESCRIPTION OF THE DRAWINGS

Embodiments of the invention will now be described, by way of example, with reference to the accompanying drawings, in which.

DETAILED DESCRIPTION

Figure 1:
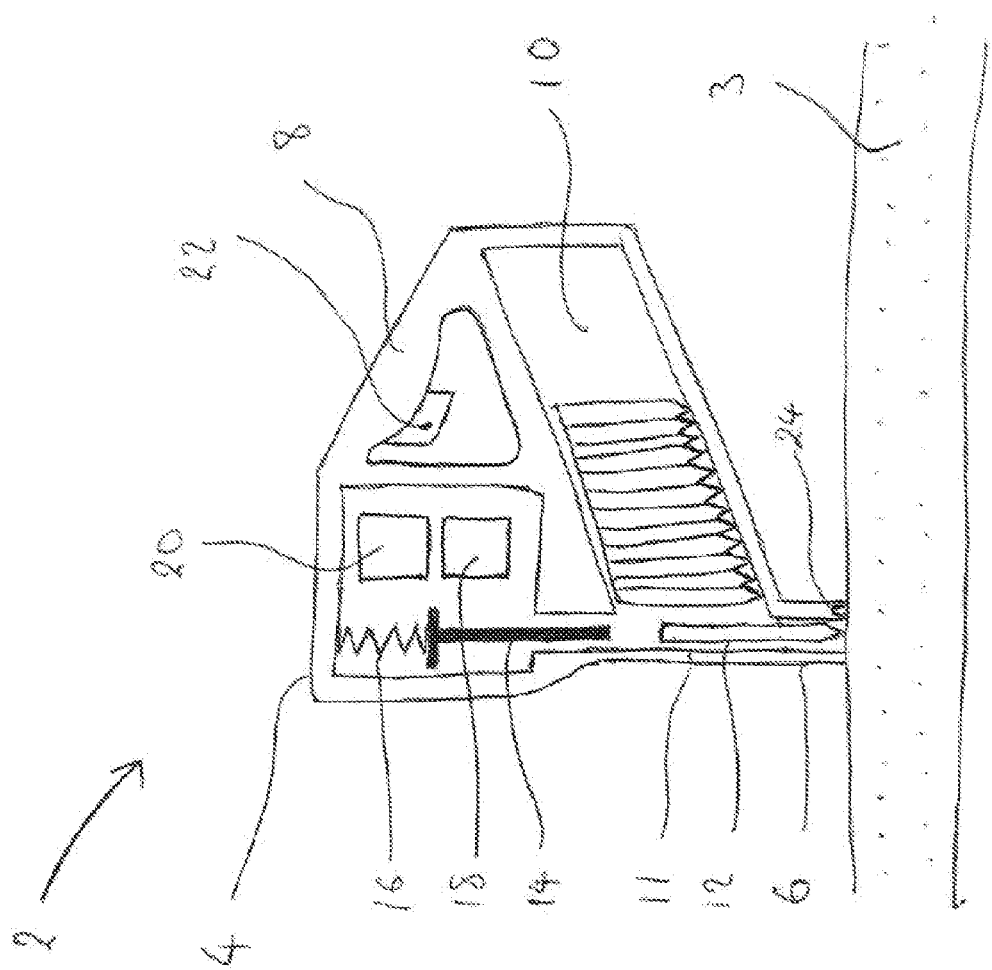
FIG. 1 is a schematic cross-sectional view of a nail gun according to one embodiment of the invention.

FIG. 1 shows a nail gun 2 for inserting a nail 12 into a workpiece 3. The nail gun 2 comprises a housing 4, a nose 6, a handle 8, and a nail feeder 10. The nose 6 is defined by a hollow tube 11 which is open laterally to receive nails 12 from the nail feeder 10. A blade 14 (alternatively referred to as a striker) is disposed within the housing 4 and is displaceable longitudinally within the interior of the tube 11. During use, the blade 14 contacts a head of the nail 12 so as to drive the nail into the workpiece 3.

The nail gun 2 further comprises a biasing member 16, a prime mover, a control system 20 and a trigger 22. The prime mover includes a motor 18 configured to move the blade 14 longitudinally within the tube 11 against the action of the biasing member 16 using a blade return mechanism (not shown). The motor 18 may include any suitable motor(s), e.g., a brushless DC motor. The blade return mechanism may be any suitable mechanism for translating the blade 14, and may in particular comprise lead screws, cams, gears, linkages or the like. The biasing member 16 is in the form of a compression spring, but may alternatively be substituted with any suitable source of potential energy, such as a tension spring, compressed air, a fuel-air mixture, electromagnets or the like. The nail gun 2 may be mains powered or battery powered. The control system 20 may include one or more suitable printed circuit boards ("PCBs") mounted with control electronics arranged to be electrically connected, directly or indirectly, with other electrical components (e.g., sensors, motor, etc.) of the nail gun 2 for controlling operation of the nail gun 2. In one example the control system includes a single PCB mounted with control electronics for controlling operation of the nail gun 2. In another example, the control system includes multiple PCBs each mounted with respective control electronics for controlling operation of the nail gun 2. The PCBs may be arranged in different portions of the nail gun 2.

When the blade 14 has been retracted and the biasing member 16 is fully compressed the nail gun 2 can be fired. To fire the nail gun 2, the user presses the trigger 22. In response, the control system 20 disengages the blade 14 from the return mechanism so as to propel the blade 14 at high velocity through the tube 11 under the action of the biasing member 16. The blade 14 impacts the head of the nail 12 and drives the nail into the workpiece 3. The motor 18 is then operated to return the blade 14 to its starting position using the return mechanism and the next nail 12 enters the tube 11 from the nail feeder 10 ready for the next joining operation.

During firing, the nails 12 are ejected out the nose 6 at a very high velocity. If the nail gun 2 is operated when the nose 6 is not in contact with the workpiece 6, the nails 12 will be ejected from the nose 6 in the manner of a projectile, which has the potential to cause bodily injury. As such, it is a critical safety requirement that the nail gun 2 should only be operated when the nose 6 is in contact with the workpiece 3 and the tube 11 is oriented orthogonal to the surface of the workpiece 3 (i.e. pointing downwards in FIG. 1).

The nail gun 2 comprises a nose sensing unit 24 positioned a terminal end of the nose 6. The nose sensing unit 24 is configured to detect contact between the nose 6 and the workpiece 3 and to output one or more sensing signals to the control system 20 accordingly. The control system 20 is configured to prevent firing of the nail gun 2 when the nose 6 is out of contact with the workpiece 3 based on the sensing signals received from the nose sensing unit 24.

Figure 2:
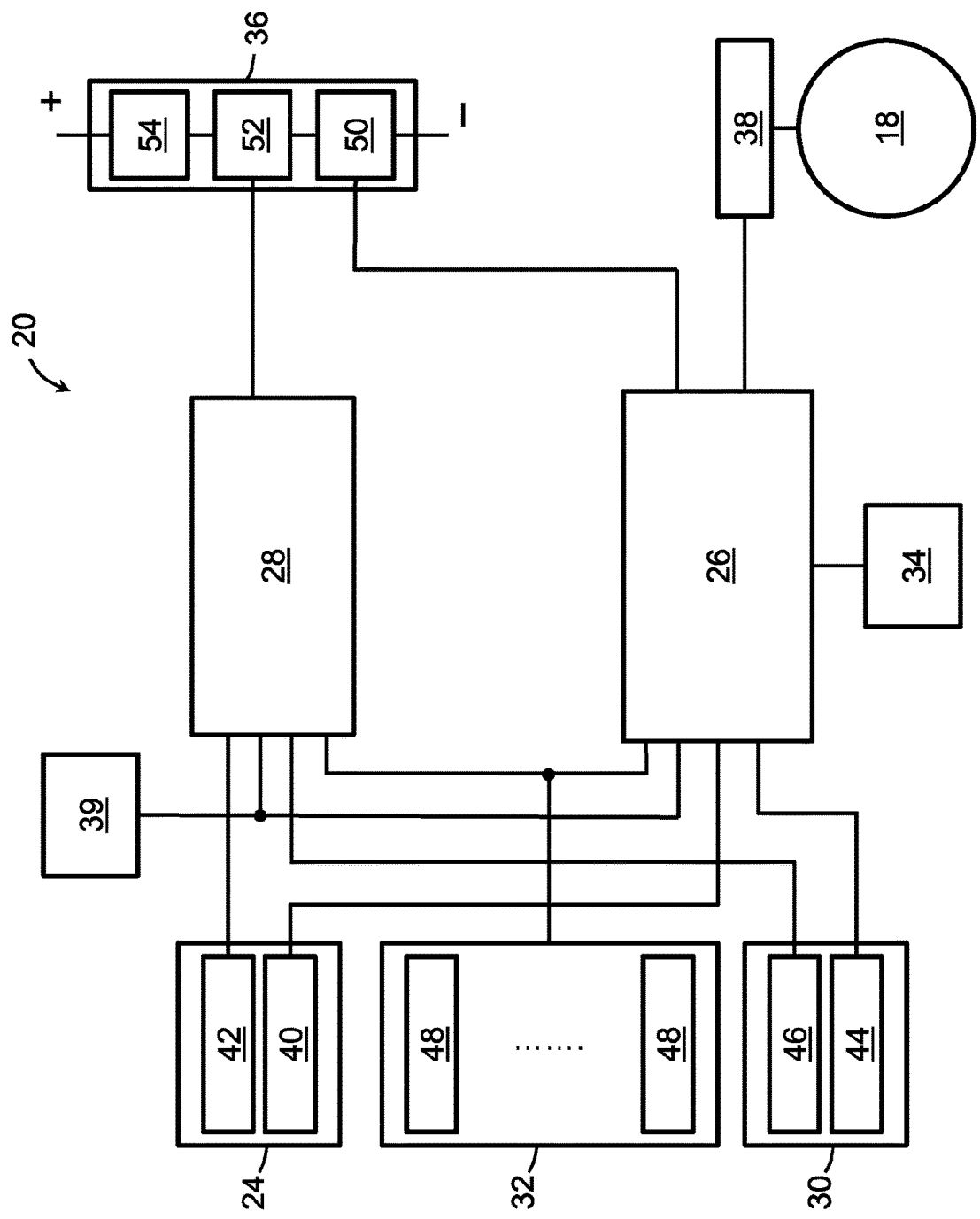
FIG. 2 is a schematic diagram of a control system according to one embodiment of the invention.

FIG. 2 shows a schematic view of the control system 20 for controlling the nail gun 2. The control system 20 comprises a first control unit 26 and a second control unit 28 having separate microcontrollers. The control system 20 further comprises the nose sensing unit 24, a temperature sensing unit 30, a non-critical sensing unit 32, a visual indication unit 34, an output unit 36, a motor controller 38 and a trigger sensor 39. In this embodiment, one or more components of the control system 20, e.g., the control units 26, 28, are arranged on a PCB. In another embodiment, one or more components of the control system 20, e.g., the control units 26, 28, are separately or distributively arranged on multiple PCBs.

The nose sensing unit 24 comprises a first nose sensor 40 and a second nose sensor 42. The first nose sensor 40 is electrically connected to the first control unit 26 and the second nose sensor 42 is connected to the second control unit 28. The first nose sensor 40 is configured to output a first sensing signal to the first control unit 26 and the second nose sensor 42 is configured to output a second sensing signal to the second control unit 28. The first control unit 26 is able to determine whether the nose 6 is in contact with workpiece 3 based upon information received from the first nose sensor 40 and, separately, the second control unit 28 is able to determine whether the nose 6 is in contact with workpiece 3 based upon information received from the second nose sensor 42. That is to say, the first control unit 26 and the second control unit 28 determine whether the nose 6 is contacting the workpiece 3 independently of one another based on different inputs. The first and second nose sensors 40, 42 may by any suitable type of sensor for determining whether the nose 6 is in contact with the workpiece 3. For example, the first and second sensors 40, 42 may be contact sensors (such as mechanical switches), proximity sensors, optical sensors (e.g., IR transmit/receive element(s)), force sensors, position sensors, or the like.

The temperature sensing unit 30 comprises a first temperature sensor 44 and a second temperature sensor 46. The first and second temperature sensors 44, 46 are thermally coupled to the motor 18 and the PCB, and are configured to sense the temperatures of the motor 18 and the PCB. In one example, the first and second temperature sensors 44, 46 are each configured to sense respective temperatures of the motor 18 and the PCB. In another example, the first and second temperature sensors 44, 46 are each configured to sense a temperature indicative of the temperatures of the motor 18 and the PCB. The first temperature sensor 44 is electrically connected to the first control unit 26 and the second temperature sensor 46 is electrically connected to the second control unit 28. The first control unit 26 is able to determine the temperatures of motor 18 and the PCB based on information received from the first temperature sensors 44, and the second control unit 28 is separately able to determine the temperatures of the motor 18 and the PCB based on information received from the second temperature sensor 46. In another embodiment, the first and second temperature sensors 44, 46 are thermally coupled to only the motor 18 or only the PCB, and are accordingly configured to sense the temperature of the motor 18 or the PCB; and the first and second control units 26, 28 are accordingly able to determine the temperature of the motor 18 or the PCB based on information received from the respective first and second temperature sensors 44, 46. The temperature of the PCB may refer to an overall temperature of the PCB or to a local temperature of specific electronic control component(s) arranged on the PCB.

In the present embodiment, the motor temperature and the PCB temperature are considered to be a critical safety characteristic of the nail gun 2, and the nail gun 2 should be prevented from firing if one or both of the motor temperature and the PCB temperature are too hot. However, in alternative embodiments one or both of the motor temperature and the PCB temperature may be considered to be a non-critical safety characteristic.

The non-critical sensing unit 32 comprises a number of non-critical sensors 48. The non-critical sensors 48 are configured to sense operating characteristics of the nail gun 2 which are not safety-critical. That is to say, operating characteristics which either do not have an associated unsafe range or which can be measured with sufficient accuracy and reliability that a back-up sensor is not required. Such non-critical operating characteristics may include the position of the blade return mechanism, the position of the blade 14, the number of nails remaining in the nail feeder 10, the power remaining in any associated battery or the like. The non-critical sensors 48 are electrically connected to both the first control unit 26 and the second control unit 28.

The visual indication unit 34 is configured to display visual information relating to the operating state of the nail gun 2 to the user. This may include an indication of the power level of the nail gun 2, the number of nails remaining, and whether the safety-critical operating characteristics are within a safe range (i.e. whether the nail gun 2 can be fired) or the like. The visual indication unit 34 may comprise one or more LEDs, and/or may comprise a display such as a liquid crystal display. The visual indication unit 34 is electrically connected to the first control unit 26 such that it is operable to display information received from the first control unit 26. The visual indication unit 34 need only be connected to one of the control units 26, 28. In some embodiments, the first control unit 26 and second control unit 28 are in electrical communication with one another, and the visual indication unit 34 may be able to display a warning when one of the control units 26, 28 outputs a control signal and the other control unit 26, 28 does not (thereby indicating to the user that a malfunction may be present). In alternative embodiments the visual indication unit 34 may be additionally or alternatively connected to the second control unit 28.

The output unit 36 comprises a first switching unit 50, a second switching unit 52, and a solenoid 54. The first switching unit 50 is electrically connected to the first control unit 26 and is configured to activate in response to a first control signal received from the first control unit 26. The second switching unit 52 is electrically connected to the second control unit 28 and is configured to activate in response to a second control signal received from the second control unit 28. The first and second switching units 50, 52 may be any suitable electrical or electromechanical switches, such as for example FETs, MOSFETs or the like. The first switching unit 50, second switching unit 52 and solenoid 54 are electrically connected in series between a positive power source (e.g. battery supply) and a negative power source (e.g. battery return).

When the first and second switching units 50, 52 are activated, the electrical connection from the positive power source to the negative power source across the output unit 36 is completed, and the solenoid 54 is actuated. Actuation of the solenoid 54 releases the blade 14 from the blade return mechanism, causing the blade 14 to accelerate through the tube 11 under the action of the biasing member 16 and strike the nail 12 into the workpiece 3. The solenoid 54 may be connected to the blade 14 and/or blade return mechanism in any suitable manner to enable quick release of the blade 14. For example, the solenoid may 54 may be mechanically connected to the blade return mechanism, or may be mounted to the housing 4. In alternative embodiments the solenoid may be replaced with substantially any suitable mechanism for firing the blade 14. For example, if an air-fuel mixture is used as the source of potential energy, the solenoid may be replaced with a spark plug for igniting the air-fuel mixture. Alternatively, if compressed air is used as the source of potential energy, the solenoid may be replaced with an electromechanical quick release valve.

The motor control unit 38 is electrically connected to the first control unit 26 and is operable to control the motor 18 in response to a motor control signal received from the first control unit 26. Controlling the motor 18 may comprise starting, stopping and controlling the speed and direction of the motor 18. Additionally or alternatively, the motor control unit 38 may be electrically connected to the second control unit 28.

The trigger sensor 39 is electrically connected to both the first control unit 26 and the second control unit 28. When it is desired to fire the nail gun 2, user then depresses the trigger 22. In response to the actuation of the trigger 22, the first control unit 26 determines, based on the information received from the first nose sensor 40 and any other safety-critical sensors (such as the first temperature sensor 44), whether to output the first control signal. If the first nose sensor 40 detects that the nose 6 is in contact with the workpiece 3 and the first temperature sensor 44 detects that the temperature of the motor 18 and/or the temperature of the PCB is within safe limits, the first controller 26 will output the first control signal. Likewise, if the second nose sensor 42 detects that the nose 6 is in contact with the workpiece 3 and the second temperature sensor 46 detects that the temperature of the motor 18 and/or the temperature of the PCB is within safe limits, the second controller 28 will output the second control signal. The first switching unit 50 will close in response to the first control signal and the second switching unit 52 will close in response to the second control signal. When both the first and second switching units 50, 52 are closed, the solenoid 54 will actuate to release the blade 14 and fire the nail 12.

The first control unit 26 and the second control unit 28 are configured to determine, independently of one another, whether the operating conditions of the nail gun 2 are safe. In particular, the first control unit 26 receives sensing signals from the first nose sensor 40 and first temperature sensor 44 compares the signals to an associated safe operating range. In the case of the nose sensor 40, the safe operating range is when the nose 6 is in contact with the workpiece 3 (e.g. if the nose sensor 40 is a contact switch the safe operating range may be when the switch is closed, and the unsafe range may be when the switch is open). In the case of the temperature sensor 44, the safe operating range may be the range of operating temperatures recommended by the manufacturer of the motor 18 and/or the manufacturer of the PCB. If the both the first nose sensor 40, the first temperature sensor 44 and the non-critical sensors 48 are within their safe operational ranges, the first control unit 26 will output the first control signal. Likewise, the second control unit 28 makes a corresponding determination based upon sensing signals received from the second nose sensor 42, the second temperature sensor 46 and the non-critical sensors 48.

If one of the control units 26, 28 determines that it is not safe to fire, the associated control signal will not be output to the relevant switching unit 50, 52. Consequently, the relevant switching unit 50, 52 will remain open, preventing the solenoid 54 from actuating and thereby preventing firing of the nail 12. Because the two control units 26, 28 process the signals from the nose sensors 40, 42 separately, it is possible to independently verify the decision of one control unit 26, 28 with the decision of the other to account for any possible malfunction in the control system 20. Only when both of the control units 26, 28 are in agreement with one another will the nail gun 2 be fired. As such, the two control units provide a fail-safe in the event that there is a problem with one of the nose sensors 40, 42 which could cause the nail gun 2 to be fired in unsafe conditions.

The first control unit 26 has a first control logic and the second control unit 28 has a second control logic. Preferably, the first control logic is different to the second control logic. In particular, the first and second control logics may be designed by different teams of engineers in isolation from one another whilst working towards a common functional specification. The first and second control logics may be implemented as firmware. The first and second microcontrollers are preferably separate models of microcontroller having different system architectures. By ensuring that the control logics and system architectures of the first and second controllers 26, 28 are different, it is possible to prevent firing of the nail gun 2 in outlying circumstances where the control logic of one control unit erroneously decides that the associated control signal should be output when in fact it is not safe to operate the nail gun 2. As such, the overall safety and robustness of the control system 20 is improved.

Although the control system 20 has been described in relation to a nail gun, it will be appreciated that the control system 20 can be applied to any suitable tool where it is necessary to prevent operation of the tool in unsafe conditions. For example, the control system 20 may be incorporated within a power tool in particular fastener driver such as drill, driver, jigsaw, circular saw, or the like.

It will be appreciated that the control system 20 may be used to monitor substantially any suitable safety-critical operating characteristic of a power tool which would necessitate operation of the power tool being prevented when the operating characteristic is outside a safe range. For example, this could include the orientation of the tool with respect to gravity, the position of a safety guard, the presence of a tool element, the number of activation cycles up to a fatigue safety limit, connection of power, fuel, or compressed air supply lines, or the like.

The control system 20 may be configured to monitor any number of operating characteristics. For example, the control system 20 could monitor a single operating characteristic, such as the position of the nose 6 relative to the workpiece 3. In alternative embodiments the control system 20 may monitor two, three, four or more operating characteristics depending upon the requirements of the power tool.

The control system 20 may have any suitable number of control units configured to determine whether an operating characteristic is within a safe operating range independently of the first and second control units 26, 28. For example, the control system may have three, four or more control units.

It will be appreciated that providing more control units increases the chance of preventing unsafe activation of the power tool. When the control system 20 comprises a plurality of control units, the output unit 36 may be configured to prevent activation of the power tool if at least one of the control signals is not received by the output unit 36. This can be achieved for example by providing a plurality of switching units connected in series.

The control unit, e.g., control unit 26, control unit 28, etc., may be implemented using a processor and, optionally, a memory that stores control logics (e.g., in the form of program instructions). The processor may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process signal, information, and/or data. The memory may include one or more volatile memory unit (such as RAM, DRAM, SRAM), one or more non-volatile memory unit (such as ROM, PROM, EPROM, EEPROM, FRAM, MRAM, FLASH, SSD, NAND, and NVDIMM), or any of their combinations.

Figure 3:
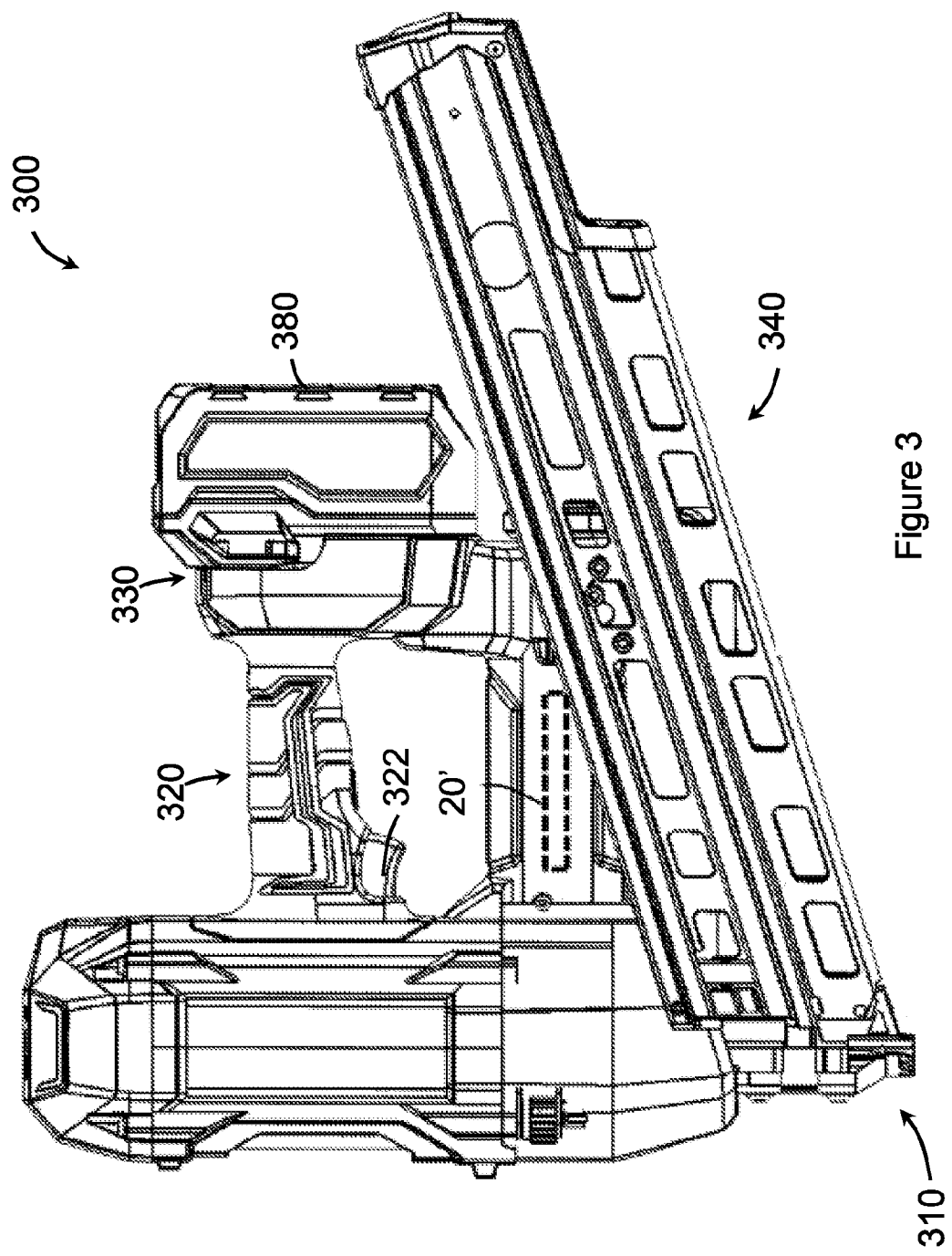
FIG. 3 is a side view of a fastener driver according to one embodiment of the invention.

FIG. 3 shows a fastener driver 300 that incorporates a control system 20' that is similar or the same, structurally and/or functionally, as the control system 20. The fastener driver 300 includes a main body with a nose portion 310 arranged to engage a workpiece and at which fasteners are driven into the workpiece, a handle portion 320 with a user actuatable trigger 322 for operating the driver 300 (e.g., to fire the fastener), and a battery pack receptacle 330 that removably receives a battery pack 380. The fastener driver 300 also has a fastener magazine 340 configured to receive fasteners (e.g., nails, staples, brads, etc.) to be fired by the driver 300. In the present embodiment, the fastener driver 300 includes the above-described components in the nail gun of FIG. 1. In another embodiment, the the fastener driver 300 includes one or more of the above-described components in the nail gun of FIG. 1.

In one exemplary implementation, the fastener driver 300 has a structure similar to the fastener driver disclosed in US patent application no. U.S. Ser. No. 15/619,887 filed on 12 Jun. 2017. Such a fastener driver includes, among other components, a drive blade movable from a retracted position to a driven position for driving a fastener into a workpiece; a gas spring mechanism for driving the drive blade from the retracted position to the driven position, the gas spring mechanism including a piston movable between a retracted position and a driven position; a first return mechanism for moving the drive blade from the driven position toward the retracted position; and a second return mechanism for moving the piston from the driven position toward the retracted position. The first and second return mechanisms may operate in parallel to return the drive blade and the piston to their respective retracted positions. The first return mechanism may be an extensible cylinder. The second return mechanism may include a cam/cam lobe engageable with the piston. The piston may be displaced from the driven position toward the retracted position in response to rotation of the cam lobe.

Figure 4:
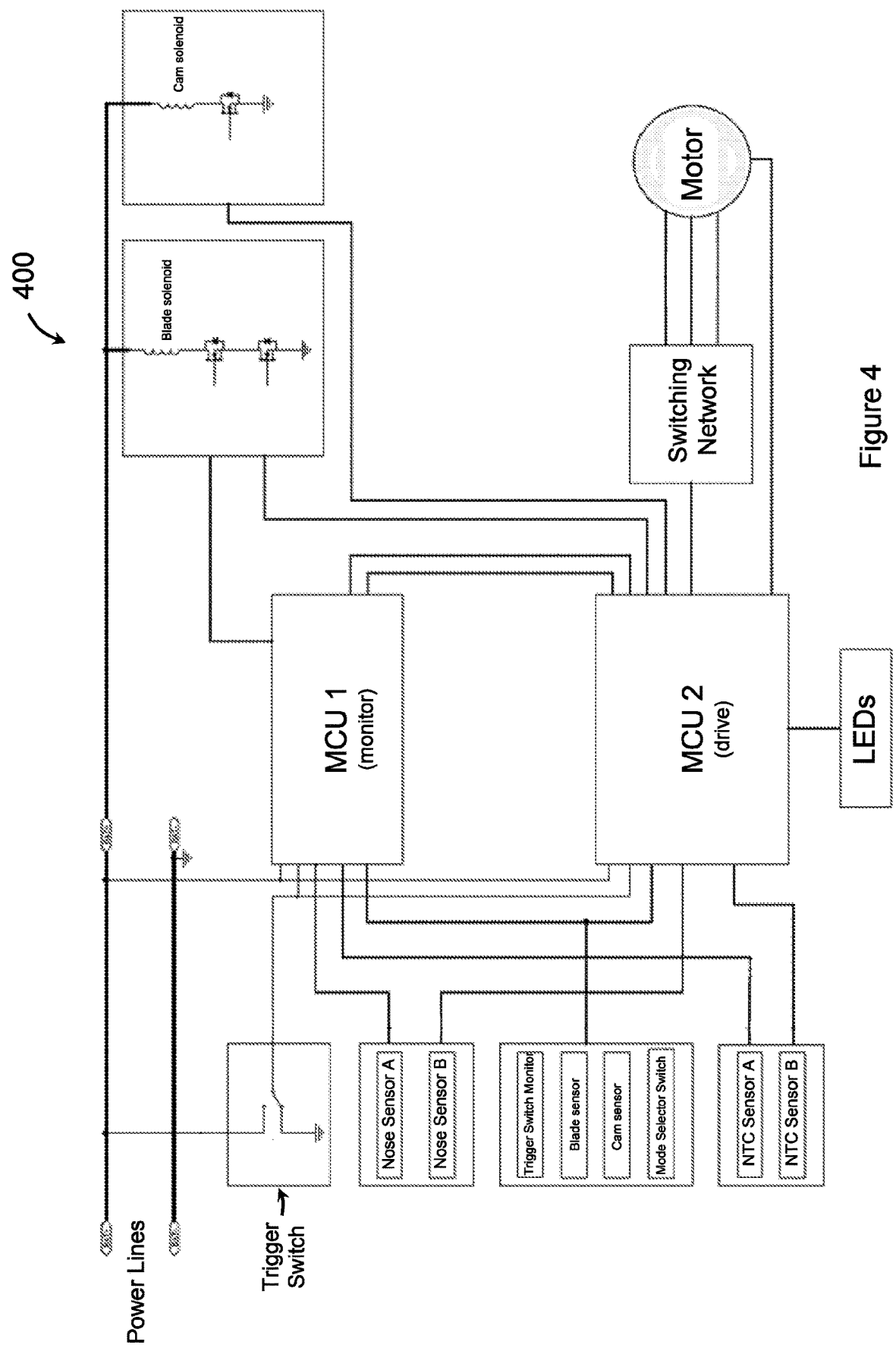
FIG. 4 is a schematic diagram of an implementation of the control system of FIG. 2 according to one embodiment of the invention.

FIG. 4 shows an exemplary implementation 400 of the control system 20 of FIG. 2 or the control system 20' of FIG. 3. The implementation 400 is self-explanatory and so will not be described in detail. In one exemplary implementation, blade solenoid may be operably coupled with the blade sensor and the blade to control operation of the blade (e.g., the blade solenoid may be part of the above-mentioned first return mechanism); the cam solenoid may be operably coupled with the cam sensor and the cam/cam lobe to control operation of the cam/cam lobe (e.g., the cam solenoid may be part of the above-mentioned second return mechanism). The implementation 400 can be implemented on another power tool.

It will be appreciated by persons skilled in the art that numerous variations and/or modifications may be made to the invention as shown in the specific embodiments without departing from the scope of the invention as broadly described. The described embodiments of the invention should therefore be considered in all respects as illustrative, not restrictive.

The invention claimed is:

1. A control system for a power tool, comprising:
   a sensing unit configured to sense an operating characteristic of the power tool;
   a first control unit configured to determine whether the operating characteristic is within a safe operational range, and to output a first control signal at least partially based on the determination;
   a second control unit configured to determine whether the operating characteristic is within a safe operational range independently of the first control unit, and to output a second control signal at least partially based on the determination; and
   an output unit configured to receive the first and second control signals and to activate the power tool when the first and second control signals are received.

2. A control system according to claim 1, wherein the sensing unit comprises:
   a first sensor configured to sense the operating characteristic and to output a first sensing signal to the first control unit; and
   a second sensor configured to sense the operating characteristic independently of the first sensor and to output a second sensing signal to the second control unit.

3. A control unit according to claim 2, wherein the first control unit is configured to determine whether the operating characteristic is within a safe operational range at least partially based upon the first sensing signal and wherein the second control unit is configured to determine whether the operating characteristic is within a safe operational range at least partially based upon the second sensing signal.

4. A control system according to claim 1, wherein the output unit comprises:
   a first switching unit configured to activate in response to the first control signal; and
   a second switching unit configured to activate in response to the second control signal;
   wherein activation of the first switching unit and second switching unit causes activation of the power tool.

5. A control system according to claim 4, wherein the first switching unit and the second switching unit are connected in series.

6. A control system according to claim 4, wherein the first and second switching units each comprise a transistor, FET, or MOSFET.

7. A control system according to claim 1, wherein the power tool comprises a trigger configured to output a trigger signal to the first control unit and the second control unit simultaneously, and
   wherein the first control unit is configured to output the first control signal at least partially based on the trigger signal, and the second control unit is configured to output the second control signal at least partially based upon the trigger signal.

8. A control system according to claim 1, wherein the first control unit is configured to output the first control signal based on a first control logic and wherein the second control unit is configured to output the second control signal based on a second control logic different to the first control logic.

9. A control system according to claim 1, wherein the first control unit comprises a first microcontroller having a first firmware, and wherein the second control unit comprises a second microcontroller having a second firmware different to the first firmware.

10. A control system according to claim 1, wherein the operating characteristic is contact between a nose of the power tool and a workpiece.

11. A control system according to claim 10, wherein the sensing unit comprises one or more contact sensors.

12. A control system according to claim 1, wherein the operating characteristic is a first characteristic and the sensing unit is a first sensing unit, and wherein the control system further comprises:
   a second sensing unit configured to sense a second operating characteristic of the power tool; and
   wherein the first control unit is configured to determine whether the second operating characteristic is within a safe operational range and to output the first control signal at least partially based on the determination; and
   wherein the second control unit is configured to determine whether the second operating characteristic is within a safe operational range and to output the second control signal at least partially based on the determination.

13. A control system according to claim 12, wherein the second sensing unit comprises:
   a third sensor configured to sense the second operating characteristic; and
   a fourth sensor configured to sense the second operating characteristic independently of the third sensor;
   wherein the third sensor is configured to output a third sensing signal to the first control unit and the fourth sensor is configured to output a fourth sensing signal to the second control unit.

14. A control system according to claim 12, wherein the second operating characteristic comprises: a temperature of a prime mover of the power tool and/or a temperature of a PCB of the power tool.

15. A control system according to claim 14, wherein the second sensing unit comprises one or more temperature sensors.

16. A power tool comprising the control system according to claim 1.

17. A power tool according to claim 16, wherein the power tool is a fastener driver configured to drive a fastener into a workpiece.

18. A power tool according to claim 16, wherein the power tool comprises a nose, and wherein the sensing unit is positioned at a terminal end of the nose and is configured to detect contact between the nose and a workpiece.

19. A method of controlling a power tool, comprising:
   sensing an operating characteristic of a power tool using a sensing unit;
   determining whether the operating characteristic is within a safe operating range using a first control unit and outputting a first control signal at least partially based on the determination;
   determining, separately to the first control unit, whether the operating characteristic is within a safe operating range using a second control unit and outputting a second control signal at least partially based on the determination;
   receiving the first and second control signals using an output unit; and activating the power tool when the first and second control signals have been received by the output unit.

20. A method according to claim 19, wherein the method further comprises:
   sensing the operating characteristic using a first sensor and outputting a first sensing signal to the first control unit using the first sensor; and
   sensing the operating characteristic, independently of the first sensor, using a second sensor, and outputting a second sensing signal to the second control unit using the second sensor.

21. A method according to claim 20, wherein the method further comprises:
   determining whether the operating characteristic is within a safe operational range at least partially based upon the first sensing signal; and
   determining whether the operating characteristic is within a safe operational range at least partially based upon the second sensing signal.

22. A method according to claim 19, wherein the method further comprises:
   outputting a trigger signal to the first control unit and the second control unit simultaneously in response to a user input;
   outputting the first control signal at least partially based upon the trigger signal; and
   outputting the second control signal at least partially based upon the trigger signal.

23. A method according to claim 19, wherein the operating characteristic is a first characteristic and the sensing unit is a first sensing unit, and wherein the method further comprises:
   sensing a second operating characteristic of the power tool using a second sensing unit;
   determining whether the second operating characteristic is within a safe operating range using the first control unit and outputting the first control signal at least partially based on the determination; and
   determining, separately to the first control unit, whether the operating characteristic is within a safe operating range using the second control unit and outputting the second control signal at least partially based on the determination.

24. A method according to claim 23, wherein the method comprises:
   sensing the second operating characteristic using a third sensor and outputting a third sensing signal to the first control unit using the third sensor; and
   sensing the operating characteristic, independently of the third sensor, using a fourth sensor and outputting a fourth sensing signal to the second control unit using the fourth sensor.

* * * * *